US012673273B2

(12) United States Patent
Boon et al.

(10) Patent No.: US 12,673,273 B2
(45) Date of Patent: Jul. 7, 2026

(54) PROCESS FOR THE SEPARATION OF A PRODUCT MIXTURE

(71) Applicant: Nederlandse Organisatie voor toegepast-natuurwetenschappelijk Onderzoek TNO, 's-Gravenhage (NL)

(72) Inventors: Jurriaan Boon, 's-Gravenhage (NL); Vladimir Dikic, 's-Gravenhage (NL); Marija Saric, 's-Gravenhage (NL)

(73) Assignee: Nederlandse Organisatie voor toegepast-natuurwetenschappelijk Onderzoek TNO, 's-Gravenhage (NL)

( * ) Notice: Subject to any disclaimer, the term of this patent is extended or adjusted under 35 U.S.C. 154(b) by 206 days.

(21) Appl. No.: 18/556,104

(22) PCT Filed: Apr. 22, 2022

(86) PCT No.: PCT/EP2022/060736
§ 371 (c)(1),
(2) Date: Oct. 19, 2023

(87) PCT Pub. No.: WO2022/223801
PCT Pub. Date: Oct. 27, 2022

(65) Prior Publication Data
US 2024/0181370 A1 Jun. 6, 2024

(30) Foreign Application Priority Data

Apr. 22, 2021 (EP) ..................................... 21169963

(51) Int. Cl.
| | |
|---|---|
| *B01D 3/34* | (2006.01) |
| *C01B 7/14* | (2006.01) |
| *C02F 1/04* | (2023.01) |
| *C02F 101/12* | (2006.01) |

(52) U.S. Cl.
CPC ............... *B01D 3/346* (2013.01); *C01B 7/14* (2013.01); *C02F 1/04* (2013.01); *C02F 2101/12* (2013.01)

(58) Field of Classification Search
CPC .............. B01D 3/346; C02F 1/04; C01B 7/14
See application file for complete search history.

(56) References Cited

U.S. PATENT DOCUMENTS

| | | | |
|---|---|---|---|
| 4,061,633 A | 12/1977 | Blyakhman et al. | |
| 4,140,586 A | 2/1979 | Kwasnoski et al. | |
| 4,327,184 A | 4/1982 | Johnson et al. | |
| 4,511,382 A * | 4/1985 | Valencia ................ | F25J 3/0209 62/929 |
| 5,141,630 A * | 8/1992 | Grosboll ................ | B01D 3/343 208/356 |
| 5,335,504 A * | 8/1994 | Durr ...................... | B01D 3/141 62/929 |
| 6,458,856 B1 | 10/2002 | Peng et al. | |
| 7,454,923 B2 * | 11/2008 | Howard ................ | F25J 3/0209 62/617 |
| 7,461,522 B2 * | 12/2008 | Howard ................ | F25J 3/0209 62/639 |
| 2004/0182786 A1 * | 9/2004 | Colling ................... | B01D 3/14 210/640 |
| 2008/0066494 A1 * | 3/2008 | Howard ................... | F25J 3/028 62/639 |
| 2020/0002622 A1 * | 1/2020 | Dugas ..................... | C10L 3/101 |
| 2020/0002628 A1 * | 1/2020 | Dugas ..................... | C10G 5/06 |

FOREIGN PATENT DOCUMENTS

| | | | | |
|---|---|---|---|---|
| EP | 0646037 A1 | 4/1995 | | |
| ES | 2856258 T3 * | 9/2021 | ............. | C07C 41/09 |
| GB | 1448919 A | 9/1976 | | |
| WO | 2004085308 A1 | 10/2004 | | |

OTHER PUBLICATIONS

ESPACENET Machine Translation of ES 2856258 Obtained Aug. 7, 2025. (Year: 2025).*

* cited by examiner

*Primary Examiner* — Jonathan Miller
(74) *Attorney, Agent, or Firm* — Ipsilon USA—NLO

(57) ABSTRACT

The invention provides the use of a clearing gas in the separation of a mixture comprising a light and a heavy component that are difficult to separate. The invention further concerns a process for such a separation, comprising (a) providing a product mixture containing at least a light component and a heavy component, wherein a binary system of the light component and the heavy component has a Henry's law constant of at least 0.001 mol m$^{-3}$ Pa$^{-1}$, and the boiling point of the light component is at least 30° C. higher than the boiling point of the heavy component, determined at ambient pressure; (b) subjecting the product mixture to a distillation step, wherein the product mixture is heated in a distillation column to a distillation temperature at a distillation pressure; (c) feeding a clearing gas at a location below the feed point of the product mixture; (d) collecting at the top of the distillation column a product gas containing the light component and the clearing gas; (e) collecting at the bottom of the distillation column a product liquid containing the heavy component.

14 Claims, No Drawings

PROCESS FOR THE SEPARATION OF A PRODUCT MIXTURE

The present invention relates to the separation by distillation of a light component and a heavy component, which are normally difficult to separate.

BACKGROUND

Chemical synthesis of small molecules is often hampered by difficult separation. Chemical reactions often do not run to completion, which leads to the formation of product mixtures, which need to be separated to obtain valuable compounds. For example, in the direct dimethyl ether synthesis from syngas, the separation of dimethyl ether (the desired product) from $CO_2$ (one of the reactants/side products) is known in the art to be problematic.

WO 2017/121817 describes a process for the synthesis of dimethyl ether from a feedstock comprising $H_2$ and $CO_x$. A gaseous mixture comprising dimethyl ether is obtained, which is subjected to dimethyl ether/synthesis gas separation, wherein dimethyl ether is separated from the other components in the gaseous mixture, such as $H_2$, CO, and $CO_2$. This separation step may typically be performed by flash evaporation, distillation, or a combination thereof. The use of a flash separation is associated with some known problems. In case this is operated such that $CO_2$ is evaporated, significant amounts of dimethyl ether are lost in the off-gas of the flash evaporation. If the flash evaporation is operated such that $CO_2$ is not evaporated, significant amounts of $CO_2$ remain in the product mixture. Further separation of $CO_2$ and dimethyl ether using a distillation column may be needed, which is energy consuming and may provide near-complete separation only with a high number of stages and a large reflux ratio.

Alternative proposed solutions for this problematic separation include scrubbing (see U.S. Pat. No. 6,458,856) and absorption (see US 2015/0232401 and KR 100882726). U.S. Pat. No. 6,458,856 describes three approaches to separate $CO_2$ from dimethyl ether after the one-step production of dimethyl ether from synthesis gas: (1) by scrubbing out dimethyl ether (and methanol) in the dimethyl ether reactor; (2) by removing $CO_2$ from the syngas before dimethyl ether synthesis; and (3) downstream product separation, in particular by scrubbing dimethyl ether from unreacted syngas using a scrubbing solvent. US 2015/0232401 describes a process for the preparation of dimethyl ether by catalytic conversion of synthesis gas, comprising a step wherein the product mixture comprising dimethyl ether and $CO_2$ is contacted with a liquid absorbent capable of absorbing $CO_2$. KR 100882726 describes a method for separating dimethyl ether from a product mixture of dimethyl ether synthesis, by using an aqueous methanol solution as a dimethyl ether absorption solvent.

The present invention provides in the need for an efficient separation of mixtures that are difficult to separate, such as dimethyl ether and $CO_2$.

SUMMARY

The inventors have developed an improved distillation process, wherein the separation of light and heavy components is improved. The distillation according to the invention reduces the reflux ratio within the distillation column, reduces the energy consumption of the distillation, increases the yield of the heavy component (less heavy component ends up in the top fraction) and reduces the amount of required equilibrium stages needed in the distillation column. In addition, the need for a flash evaporation upstream of the distillation column is avoided, and the distillation according to the invention has an increased flexibility in terms of the operating pressure, which enables more efficient integration with synthesis reactors. These effects are achieved by feeding a clearing gas into the distillation column, in addition to the mixture to be separated.

The invention is preferably defined as follows:

1. A process for the separation of a product mixture, the process comprising:
   (a) providing the product mixture containing at least a light component and a heavy component, wherein a binary system of the light component and the heavy component has a Henry's law constant of at least $0.001 \text{ mol m}^{-3} \text{ Pa}^{-1}$, and the boiling point of the light component is at least 30° C. lower than the boiling point of the heavy component, determined at ambient pressure;
   (b) subjecting the product mixture to a distillation step, wherein the product mixture is heated in a distillation column to a distillation temperature at a distillation pressure;
   (c) feeding a clearing gas at a location below the feed point of the product mixture;
   (d) collecting at the top of the distillation column a product gas containing the light component and the clearing gas;
   (e) collecting at the bottom of the distillation column a product liquid containing the heavy component.

2. The process according to embodiment 1, wherein the product gas obtained in step (d) is recycled to a reaction step that affords the product mixture or is used for a carbon capture and utilization process.

3. The process according to embodiment 1 and 2, wherein the product mixture originates from reaction step selected from a dimethyl ether synthesis reaction, aqueous phase $NH_3$ synthesis, Fischer-Tropsch synthesis and biomass gasification.

4. The process according to any one of the preceding embodiments, wherein the light component is selected from CO, $CO_2$, ethanol, $NH_3$, $H_2$ and $H_2O$ and/or the heavy component is selected from di-$C_{1-4}$-ethers, $C_{1-6}$-alkanes, $H_2O$ and $I_2$.

5. The process according to any one of the preceding embodiments, wherein the clearing gas is selected from argon, helium, CO, $N_2$, air, natural gas, water, light hydrocarbons, $H_2$ and mixtures thereof.

6. The process according to any one of the preceding embodiments, wherein:
   (i) the light component is $CO_2$, the heavy component is dimethyl ether;
   (ii) the light component is $CO_2$, the heavy component is n-butane;
   (iii) the light component is water, the heavy component is $I_2$;
   (iv) the light component is $NH_3$, the heavy component is water.

7. The process according to embodiment 6, wherein the light component is $CO_2$, the heavy component is dimethyl ether and the clearing gas is $H_2$ or $CH_4$.

8. The process according to any one of the preceding embodiments, wherein a binary system of the light component and the heavy component has a Henry's law constant of at least $0.002 \text{ mol m}^{-3} \text{ Pa}^{-1}$.

9. The process according to any one of the preceding embodiments, wherein the boiling point of the light component is at least 50° C., preferably at least 80° C., lower than the boiling point of the heavy component, determined at ambient pressure.

10. The process according to any one of the preceding embodiments, wherein a binary system of the heavy component and the clearing gas has a Henry's law constant of at most 0.001 mol $m^{-3}$ $Pa^{-1}$, determined at ambient pressure and temperature.

11. The process according to any one of the preceding embodiments, wherein no flash evaporation step is performed upstream of the distillation column.

12. Use of a clearing gas in the separation of a product mixture containing light component and a heavy component, wherein the separation is performed in a distillation column to a distillation temperature at a distillation pressure and affords a product gas containing the light component and the clearing gas; and a product liquid containing the heavy component.

13. The use according to embodiment 12, which is for at least one of:

(i) reduction of the reflux ratio within the distillation column;

(ii) reduction of the energy consumption of the distillation column;

(iii) reduction of the loss of the second species in the product gas; and (iv) reduction of the amount of equilibrium stages in the distillation column.

DETAILED DESCRIPTION

The inventors have developed an improved distillation process, wherein the separation of light and heavy components is improved. The present invention provides a process for the separation of a product mixture, and comprises the following steps:

(a) providing the product mixture containing at least a light component and a heavy component, wherein a binary system of the light component and the heavy component has a Henry's law constant of at least 0.001 mol $m^{-3}$ $Pa^{-1}$, and the boiling point of the light component is at least 30° C. lower than the boiling point of the heavy component, determined at ambient pressure;

(b) subjecting the product mixture to a distillation step, wherein the product mixture is heated in a distillation column to a distillation temperature at a distillation pressure;

(c) feeding a clearing gas at a location below the feed point of the product mixture;

(d) collecting at the top of the distillation column a product gas containing the light component and the clearing gas;

(e) collecting at the bottom of the distillation column a product liquid containing the heavy component.

The Product Mixture

Many industrial processes for the chemical synthesis of components include a distillation step downstream of a reaction step, to separate light and heavy components. The light component is collected as gaseous top fraction of the distillation column, and the heavy component as liquid bottom fraction of the distillation column. In the incoming mixture, the heavy component may be a gas or a liquid, typically a liquid, and the light component is gaseous or may be dissolved in the heavy component. The distillation step is often preceded by a flash evaporation to remove most of the volatile components of the reaction product mixture. The inventors found that such a flash evaporation step is not needed in case the distillation step according to the invention is used, and could be eliminated from the downstream processing of the reaction product mixture.

Any product mixture can be subjected to the separation of the present invention. The product mixture to be separated preferably originates from a reaction, in which case the product mixture may also be referred to as a reaction product mixture. Any reaction product mixture that contains two components defined above can efficiently be separated using the process according to the invention. It is irrelevant if the light component and the heavy component are the reactant(s) or the product(s) of the reaction. In one embodiment, one of the light component and the heavy component is a reactant and the other one is a product of the reaction, preferably the light component is a reactant of the reaction and the heavy component is a product of the reaction. In an alternative embodiment, both the light component and the heavy component are products of the reaction.

Most advantageously, the light component is a reactant of the reaction and the heavy component is a product of the reaction. In the context of this embodiment, it is preferred that the light component collected at the top of the distillation column (product gas) is recycled to the reaction step. Alternatively, the product gas may be used in a carbon capture and utilization (CCU) process, which is especially useful in case the light component is $CO_2$. The reaction is thus preferably a dimethyl ether synthesis reaction. In the context of the preferred mixtures of heavy and light component, alternative preferred reactions include aqueous phase $NH_3$ synthesis, Fischer-Tropsch synthesis and biomass gasification.

The light component is obtained as the gaseous product during the distillation step, obtained as top fraction. The light component may be selected from CO, $CO_2$, ethanol, $NH_3$, $H_2$ and $H_2O$. Preferred light components are selected from $CO_2$, $H_2O$ and $NH_3$. Most preferably, the light component is $CO_2$.

The heavy component is collected as liquid bottom fraction during the distillation. During the distillation, the heavy component typically boils and condenses, and the condensates are collected as liquid bottom fraction. The heavy component is preferably selected from di-$C_{1-4}$-ethers, $C_{1-6}$-alkanes, $H_2O$ and $I_2$, more preferably the heavy component is dimethyl ether, $H_2O$, $I_2$ or n-butane. Most preferably, the heavy component is dimethyl ether.

In order to being able to separate the light and heavy components, it is preferred that the boiling point of the light component is at least 30° C. lower than the boiling point of the heavy component, preferably this difference is boiling point is at least 50° C. or even at least 80° C. This difference in boiling point is determined at atmospheric pressure (1 bar). Without being bound to a theory, it is believed that such a difference in boiling point ensures that the light component and the heavy component can be readily separated, even if the light component would have a good interaction with the heavy component, as further explained below. With lower boiling point differences, the clearing gas may aide molecules of the heavy component to the top fraction of the distillation column, where heavy component would be lost in the gaseous product stream, thereby reducing the yield of the heavy component in the bottom fraction of the distillation column. From a process perspective, there is no real upper limit to the boiling point difference, but typically the difference in boiling point between the light component and the heavy component is at most 200° C.

The process according to the invention is especially useful for separating a light component and a heavy component that have a good interaction, meaning that they are normally difficult to separate. For example, the separation of dimethyl ether and $CO_2$ is known to be difficult in view of the good interaction between the light component ($CO_2$) and the heavy component (dimethyl ether). The good interaction between the heavy and the light component may be defined as a good solubility of the light component in the heavy component. A well-known measure of the solubility of a light component (gas) in a heavy component (liquid) is the Henry's law constant. Henry's law constant (HCP) is a proportionality factor that is defined as the concentration (c) of dissolved gas in a liquid divided by the partial pressure (p) of the gas above the liquid. High Henry's law constants are obtained when the concentration of dissolved gas is relatively high when the partial pressure is relatively low, meaning that the gas dissolves well in the liquid. Any binary system of a gaseous species and a liquid species has a Henry's law constant, which may be known (see e.g. www.henrys-law.org) or may be determined experimentally by methods known to the skilled person. In the context of the present invention, it is preferred that Henry's law constant of the binary system of the light and heavy component is at least $0.001$ mol m$^{-3}$ Pa$^{-1}$, preferably at least $0.002$ mol m$^{-3}$ Pa$^{-1}$, more preferably at least $0.01$ mol m$^{-3}$ Pa$^{-1}$. The upper limit of the Henry's law constant is only governed the binary systems available, but is not limited from a practical point of view. They may be as high as $100$ mol m$^{-3}$ Pa-1 or even higher. Preferably, the Henry's law constant is not higher than $1$ mol m$^{-3}$ Pa$^{-1}$. In the context of the present invention, the Henry's law constant (HCP) is normally determined at the (ambient or elevated) pressure and temperature which corresponds to the diluted region of the light component in the binary VLE system.

Preferred combinations of light and heavy components to be separated with the process according to the invention, that have such a difference in boiling point and a Henry constant in the desired range, include: (i) dimethyl ether (heavy) and $CO_2$ (light); (ii) n-butane (heavy) and $CO_2$ (light); (iii) water (light) and 12 (heavy); and (iv) water (heavy) and ammonia (light). Preferred are combinations (i), (ii) and (iii), more preferably the combination is selected from (i) and (ii). In an especially preferred embodiment, the light component is $CO_2$ and the heavy component is dimethyl ether (combination (i)).

Distillation

The mixture is subjected to a distillation step. Distillation of a product mixture containing a light and a heavy component to separate the light component from the heavy component is known in the art. Such a distillation step is performed in a distillation column, in which the mixture is heated to a distillation temperature at a distillation pressure. The skilled person is well aware of distillation and is able to select an appropriate distillation temperature and pressure for the specific mixture to be separated. For example, the distillation temperature may be in the range of $-200°$ C. to $350°$ C., preferably in the range of $-20$ to $250°$ C. The distillation pressure may be in the range of $0.01$ to $50$ bar, preferably in the range of $15$ to $40$ bar. The inventors found that the beneficial effects of the clearing gas are greater at elevated pressure, such as $15$ bar or higher.

Distillation columns are known in the art, and any type can be used in the present invention. Typically, the distillation column comprises a boiler wherein the feed mixture is heated towards the distillation temperature. Preferably, the distillation column comprises a reboiler, which is normally located at the bottom of the column and is used to evaporate the liquids collected at the bottom. The distillation column further typically contains a feeding point at or near the middle of the column. In other words, the distillation column typically contains a rectifying section and a stripping section The distillation column is operated as common in the art. The mixture is fed into the distillation column. During distillation the heavy component boils and condenses, and accumulates at the bottom of the distillation column. The bottom fraction of the distillation thus contains the heavy component. The bottom fraction may also contain further components that accumulate at the bottom of the distillation column and that were present in the incoming mixture. The light component is gaseous and is collected at the top of the distillation column. The top fraction of the distillation thus contains the light component. The top fraction may also contain further components that accumulate at the top of the distillation column and that were present in the incoming mixture. The top fraction also contains the clearing gas.

During operation of the process according to the invention, the product mixture is fed into the distillation column. The crux of the present invention is that additionally a clearing gas is fed into the distillation column during the distillation. The clearing gas is fed at a location in the column below the feed point of the product mixture. Preferably, the clearing gas is fed at the bottom of the column. Without being bound to a theory, the inventors believe the presence of gaseous bubbles in the distillation column replaces part of the gaseous molecules of the heavy component, thereby reducing the vapour loading within the distillation column and thus reducing the number of equilibrium stages required for optimal separation. Also, less of the reflux will flow back down in the distillation column, since the clearing gas that is collected in the top fraction of the distillation column takes up a substantial part of the reflux. The clearing gas molecules as well as the molecules of the light component flow upward and are collected in the top fraction, and only the molecules of the heavy component flow back down to the bottom fraction. Thus, the reflux ratio is reduced by virtue of the clearing gas, without jeopardizing the separation efficiency of the distillation process.

The clearing gas may be any gas that does not dissolve well in the heavy component. Such a clearing gas helps to clear the liquid heavy component from the liquid component. The clearing gas preferably does not have a good interaction with the heavy component. The clearing gas should not be the same species as the light component. In a preferred embodiment, the Henry's law constant of the binary system of the heavy component and the clearing gas is at most $0.001$ mol m$^{-3}$ Pa$^{-1}$. Suitable clearing gases include argon, helium, CO, $N_2$, air, natural gas, water, light hydrocarbons (such as $C_{12}$, preferably $CH_4$), $H_2$ and mixtures thereof. In a preferred embodiment, the clearing gas is $CH_4$ or $H_2$. In an especially preferred embodiment, the clearing gas is $H_2$.

The inventors found that $H_2$ is particularly suitable as clearing gas when the light component is $CO_2$. The efficiency of $CO_2$ removal during distillation is greatly improved, as further explained below. Also, the top fraction collected from the distillation column contains $CO_2$ and $H_2$, a mixture which is perfectly suitable for a carbon capture and utilization (CCU) process. Likewise, the use of $CH_4$ as clearing gas provides a top fraction which is ideally suited for dry reforming.

The bottom fraction of the distillation column is typically the main product of the reaction, and can be used as deemed fit. The top fraction can also be used as deemed fit. For example, it can be used for carbon capture processes, e.g. when the light component is $CO_2$. The top fraction may also be recycled to the reactor, especially in case the light component is a reactant of the reaction, such as $CO_2$ in a dimethyl ether reactor. The use of the clearing gas according to the invention enables the distillation to be performed at higher pressure. The beneficial effects of the clearing gas are greater at elevated pressure, such that a pressure that is closer to the pressure of a preceding reaction step can be used. As such, the pressure changes in the overall process can be reduced and the reactor, the distillation column and the recycle to the reactor can all be kept at the elevated pressure of the reactor.

The process according to the invention has several advantages over conventional distillation processes, which do not employ a clearing gas. As is shown in the example below, the separation according to the invention requires less equipment due to the omission of a flash evaporation step, overall requires less energy, but also the distillation itself requires less energy, due to reduced fluid load in the distillation column by addition of a non-condensable component of the clearing gas. Further advantages of the distillation process according to the invention include an enhanced yield of the heavy component, a reduction in reflux ratio and a reduction in equilibrium stages within the distillation column. The enhanced yield of the heavy component in the bottom fraction of the distillation is caused by a reduced loss of that component in the light fraction and/or during flash evaporation. In other words, more of the heavy component is collected at the bottom of the distillation column when a clearing gas according to the invention is used.

Thus, the present invention also concerns the use of a clearing gas in the separation of a product mixture containing at least a light component and a heavy component, wherein the separation is performed in a distillation column at a distillation temperature at a distillation pressure and affords a product gas containing the light component and the clearing gas; and a product liquid containing the heavy component. The use according to the present aspect is typically for at least one of the following:

(i) reduction of the reflux ratio within the distillation column;

(ii) reduction of the energy consumption of the distillation column;

(iii) reduction of the loss of the heavy component in the product gas; and (iv) reduction of the amount of equilibrium stages in the distillation column.

In one embodiment, the use according to the present aspect is at least for reduction of the reflux ratio within the distillation column. In one embodiment, the use according to the present aspect is at least for reduction of the energy consumption of the distillation column. In one embodiment, the use according to the present aspect is at least for reduction of the loss of the heavy component in the product gas. In one embodiment, the use according to the present aspect is at least for reduction of the amount of equilibrium stages in the distillation column. In an especially preferred embodiment, the present use is for at least two, or at least three or most preferably all four of the above defined effects (i)-(iv).

The use of the clearing gas according to the invention also increases the flexibility of the distillation, as it can be performed at higher pressure when a clearing gas is employed. Thus, a pressure that is closer to the pressure of a preceding reaction step can be used, such that the pressure changes in the overall process can be reduced. As such, the reactor, the distillation column and the recycle to the reactor can all be kept at the elevated pressure of the reactor.

EXAMPLES

Example 1

Two reaction mixtures of a dimethyl ether synthesis reaction (see Table 1 for composition) were fed to a distillation column. The reaction was performed at 50 bar and 250° C., and distillation of the reaction product mixture at 20 bar was simulated in Aspen Plus, using the PSRK (Predictive Soave-Redlich-Kwong) equation of state, with and without clearing by hydrogen gas. The separation without clearing gas involved a flash evaporation upstream of the distillation column, operating at 50 bar and −51.9° C. (to keep dimethyl ether losses below 1%). Total energy consumption (including heat exchangers, flash vessel and the reboiler and condenser), total product (dimethyl ether) loss, number of equilibrium staged and reflux ratio of each of the four scenarios was simulated, and the results are presented in Table 2.

TABLE 1

| Feed mixture compositions (kmol/h) | | |
|---|---|---|
| Component | High-$CO_2$ mixture A | Low-$CO_2$ mixture B |
| $CO_2$ | 36.07 | 4.66 |
| $CH_3OH$ | 3.00 | 1.58 |
| $CH_3OCH_3$ (DME) | 66.18 | 82.27 |
| $H_2$ | 50.79 | 62.31 |
| CO | 12.14 | 17.26 |
| $H_2O$ | 0.27 | 0.35 |

TABLE 2

| | | Separation performance | | | | |
|---|---|---|---|---|---|---|
| Entry | Mixture | Clearing gas | Energy | DME loss | no. stages | reflux ratio |
| 1 | A | 10.8 kmol/h $H_2$ | 888.3 kW | 0.59% | 10 | 0.65 |
| 2 | A | None | 1269 kW | 1.33% | 11 | 1.7 |
| 3 | B | 13.1 kmol/h $H_2$ | 911.6 kW | 0.6% | 8 | 0.5 |
| 4 | B | None | 1065 kW | 0.9% | 15 | 2.8 |

The separation process according to the invention requires less energy (ca 150-400 kW), which may be attributed to the more efficient distillation. The amount of dimethyl ether lost in the top fraction was markedly reduced using the clearing gas. Also, the number of equilibrium stages and the reflux ratio were significantly reduced, but not at the expense of separation efficiency as demonstrated by the dimethyl ether loss.

Example 2

In a similar experiment, an equimolar mixture of 10 kmol/h $I_2$—$H_2O$ was separated by distillation at 10 bar, which was simulated in Aspen Plus, using the NRTL (nonrandom two-liquid) equation of state. Distillation was performed with and without clearing by hydrogen gas, both using 10 equilibrium stages. The separation without clearing gas was operated at 10 bar and 100-184° C. with a total energy consumption of 707 kW, while use of 2 kmol/h of the clearing gas resulted in a temperature of 91-178° C. and total energy consumption of 246 kW.

The results show that the process according to the invention, employing a clearing gas, is able outperform the conventional distillation within a pre-defined distillation column (of 10 equilibrium stages), the process of the invention requires less energy.

Example 3

In a similar experiment, product mixture C (Table 3) was separated by distillation at 10 bar using 7 and 8 equilibrium stages, which was simulated in Aspen Plus, using the NRTL (non-random two-liquid) equation of state. Distillation was performed with and without clearing by hydrogen gas, both using 8 equilibrium stages. The results are summarised in Table 4, entries 1 and 2. The separation without clearing gas was operating at −54-81° C. with a total energy consumption of 62 kW, while use of 2 kmol/h of the clearing gas resulted in a total energy consumption of 62 kW. Using 7 equilibrium stages (Table 4 entries 3 and 4), the separation without clearing gas operated at −54-81° C., with a total energy consumption of 157 kW, while stripping with 2 kmol/h resulted in a total energy consumption of 86 kW.

TABLE 3

| Feed mixture C (kmol/h) | |
| --- | --- |
| Component | Molar flowrate |
| $CO_2$ | 2.0 |
| $CH_3OH$ | 1.0 |
| n-butane | 5.0 |
| $H_2$ | 0.5 |
| CO | 1.0 |
| $H_2O$ | 0.5 |

TABLE 4

| Separation performance | | | | | |
| --- | --- | --- | --- | --- | --- |
| Entry | Mixture | Clearing gas | Energy | no. stages | reflux ratio |
| 1 | C | 2 kmol/h $H_2$ | 62 kW | 8 | 0.67 |
| 2 | C | None | 62 kW | 8 | 1.3 |
| 3 | C | 2 kmol/h $H_2$ | 86 kW | 7 | 1.5 |
| 4 | C | None | 157 kW | 7 | 4.4 |

The separation process according to the invention requires a lower reflux ratio, which may be attributed to the more efficient distillation. Based on the results shown in Table 4, the cases with clearing gas (entries 1 and 3) show a marked reduction in reflux ratio when compared to the conventional cases (entries 2 and 4). In addition, shown when comparing entries 3 and 4, for a given column size (fixed number of equilibrium stages), the operation with a clearing gas leads to a marked reduction in total energy requirement.

Example 4

In a similar experiment, product mixture D (Table 5) was separated by distillation at 30 bar using 5 equilibrium stages, which was simulated in Aspen Plus, using the NRTL (non-random two-liquid) equation of state. Distillation was performed with and without clearing by hydrogen gas, both using 5 equilibrium stages. The results are summarised in Table 4, entries 1 and 2. The separation without clearing gas was operating at 98° C. with a total energy consumption of 126 kW, while use of 1 kmol/h of the clearing gas operated at 95° C. and resulted in a total energy consumption of 111 kW. Ammonia losses were similar for both processes

TABLE 5

| Feed mixture D (kmol/h) | |
| --- | --- |
| Component | Molar flowrate |
| $CO_2$ | 1.0 |
| $H_2O$ | 4.0 |
| $NH_3$ | 5.0 |

TABLE 6

| Separation performance | | | | | |
| --- | --- | --- | --- | --- | --- |
| Entry | Mixture | Clearing gas | Energy | no. stages | reflux ratio |
| 1 | D | 1 kmol/h $H_2$ | 111 kW | 5 | 0.3 |
| 2 | D | None | 127 kW | 5 | 0.5 |

The separation process according to the invention requires a lower reflux ratio, which may be attributed to the more efficient distillation. Based on the results shown in Table 6, the use of the clearing gas (entry 1) shows a marked reduction in reflux ratio when compared to the conventional process (entry 2).

The invention claimed is:

1. A process for the separation of a product mixture, the process comprising:
   (a) providing the product mixture containing at least a light component and a heavy component, wherein a binary system of the light component and the heavy component has a Henry's law constant of at least 0.001 mol m$^{-3}$ Pa$^{-1}$, and the boiling point of the light component is at least 30° C. lower than the boiling point of the heavy component, determined at ambient pressure;
   (b) feeding the product mixture into a distillation column via a feed point and subjecting the product mixture to a distillation step, wherein the product mixture is heated to a distillation temperature at a distillation pressure;
   (c) feeding a clearing gas at a location below the feed point of the product mixture;
   (d) collecting at the top of the distillation column a product gas containing the light component and the clearing gas;
   (e) collecting at the bottom of the distillation column a product liquid containing the heavy component,
   wherein the product gas obtained in step (d) is directly recycled to a reaction step that produces the product mixture, and
   wherein the process operates with one or more of (i) reduced reflux ratio within the distillation column; (ii) reduced energy consumption of the distillation column; and (iii) reduced loss of the heavy component in the product gas, compared to the distillation of the same product mixture in the absence of a clearing gas.

2. The process according to claim 1, wherein the product mixture originates from a reaction step selected from a dimethyl ether synthesis reaction, aqueous phase $NH_3$ synthesis, Fischer-Tropsch synthesis and biomass gasification.

3. The process according to claim 1, wherein the light component is selected from CO, $CO_2$, ethanol, $NH_3$, $H_2$ and $H_2O$ and/or the heavy component is selected from di-$C_{1-4}$-ethers, $C_{1-6}$-alkanes, $H_2O$ and $I_2$.

4. The process according to claim 1, wherein the clearing gas is selected from argon, helium, CO, $N_2$, air, natural gas, water, light hydrocarbons, $H_2$ and mixtures thereof.

5. The process according to claim 1, wherein:
(i) the light component is $CO_2$, the heavy component is dimethyl ether; or
(ii) the light component is $CO_2$, the heavy component is n-butane; or
(iii) the light component is water, the heavy component is $I_2$; or
(iv) the light component is $NH_3$, the heavy component is water.

6. The process according to claim 5, wherein the light component is $CO_2$, the heavy component is dimethyl ether and the clearing gas is $H_2$ or $CH_4$.

7. The process according to claim 1, wherein a binary system of the light component and the heavy component has a Henry's law constant of at least 0.002 mol $m^{-3}$ $Pa^{-1}$.

8. The process according to claim 1, wherein the boiling point of the light component is at least 50° C. lower than the boiling point of the heavy component, determined at ambient pressure.

9. The process according to claim 1, wherein a binary system of the heavy component and the clearing gas has a Henry's law constant of at most 0.001 mol $m^{-3}$ $Pa^{-1}$, determined at ambient pressure and temperature.

10. The process according to claim 1, wherein no flash evaporation step is performed upstream of the distillation column.

11. The process according to claim 8, wherein the boiling point of the light component is at least 80° C., lower than the boiling point of the heavy component, determined at ambient pressure.

12. The process according to claim 1, wherein the process operates with a reduced reflux ratio, compared to the distillation of the same product mixture in the absence of a clearing gas.

13. The process according to claim 1, wherein the process operates with a reduced energy consumption of the distillation column, compared to the distillation of the same product mixture in the absence of a clearing gas.

14. The process according to claim 1, wherein the process operates with a reduced reduced loss of the heavy component in the product gas, compared to the distillation of the same product mixture in the absence of a clearing gas.

* * * * *